United States Patent
Lee et al.

(10) Patent No.: US 9,529,443 B2
(45) Date of Patent: Dec. 27, 2016

(54) REMOTE CONTROLLER FOR MOTION RECOGNITION

(71) Applicant: MACRON CO., LTD., Seongnam-si Gyeonggi-do (KR)

(72) Inventors: Kil-Jae Lee, Seongnam-si (KR); Nam-Hyun Cho, Yongin-si (KR)

(73) Assignee: MACRON CO., LTD, Seongnam-Si (KR)

( * ) Notice: Subject to any disclaimer, the term of this patent is extended or adjusted under 35 U.S.C. 154(b) by 0 days.

(21) Appl. No.: 14/397,762

(22) PCT Filed: May 2, 2013

(86) PCT No.: PCT/KR2013/003778
§ 371 (c)(1),
(2) Date: Oct. 29, 2014

(87) PCT Pub. No.: WO2013/165177
PCT Pub. Date: Nov. 7, 2013

(65) Prior Publication Data
US 2015/0123893 A1    May 7, 2015

(30) Foreign Application Priority Data
May 2, 2012  (KR) .......................... 10-2012-0046417

(51) Int. Cl.
G09G 5/00   (2006.01)
G06F 3/01   (2006.01)
(Continued)

(52) U.S. Cl.
CPC ........... G06F 3/017 (2013.01); G06K 9/00355 (2013.01); G06T 7/2053 (2013.01); G08C 17/00 (2013.01);
(Continued)

(58) Field of Classification Search
CPC ................. G06F 3/017; G06F 3/04883; G06T 2207/10016; G06T 2207/20224; G06T 2207/30196; G06T 2207/30241; G06T 7/0253; G06T 2207/3024; G06K 9/00355
(Continued)

(56) References Cited

U.S. PATENT DOCUMENTS 9,164,578 B2 * 10/2015 Matsubara .............. G06F 3/011
2005/0238201 A1 * 10/2005 Shamaie ............ G06K 9/00355
382/103

(Continued)

FOREIGN PATENT DOCUMENTS

JP   2004356819 A    12/2004
KR   100692526 B1    3/2007
(Continued)

*Primary Examiner* — Jennifer Nguyen
(74) *Attorney, Agent, or Firm* — William Park & Associates Ltd.

(57) ABSTRACT

The present invention relates to a method for enabling motion recognition without recognizing a hand and a remote controller for motion recognition which can suggest an efficient motion and can be implemented at a low cost in a more stable manner. The remote controller for motion recognition, according to the present invention, comprises: an image acquisition unit for acquiring consecutive images of a hand; a difference image configuration unit for obtaining difference images of the acquired consecutive images; a hand trajectory analysis unit for analyzing a moving trajectory of the hand from the difference images; a motion recognition unit for recognizing a hand motion by analyzing the hand trajectory; and a remote signal transmitter for transmitting a remote signal corresponding to the recognized hand motion such that a device to be controlled can be controlled.

9 Claims, 6 Drawing Sheets

(51) Int. Cl.
*G08C 17/00* (2006.01)
*G06K 9/00* (2006.01)
*G06T 7/20* (2006.01)

(52) U.S. Cl.
CPC ............... *G06T 2207/10016* (2013.01); *G06T 2207/20224* (2013.01); *G06T 2207/30196* (2013.01); *G06T 2207/30241* (2013.01)

(58) Field of Classification Search
USPC .......................... 345/156–158; 715/716, 863
See application file for complete search history.

(56) References Cited

U.S. PATENT DOCUMENTS

| | | | | |
|---|---|---|---|---|
| 2006/0209021 | A1* | 9/2006 | Yoo ......................... | G06F 3/017 345/156 |
| 2009/0073117 | A1* | 3/2009 | Tsurumi .................. | G06F 3/005 345/158 |
| 2010/0050133 | A1* | 2/2010 | Nishihara .............. | G06F 3/0425 715/863 |
| 2011/0107216 | A1* | 5/2011 | Bi ........................... | G06F 3/011 715/716 |

FOREIGN PATENT DOCUMENTS

| | | |
|---|---|---|
| KR | 1020100032699 A | 3/2010 |
| KR | 1020110033318 A | 3/2011 |

\* cited by examiner

REMOTE CONTROLLER FOR MOTION RECOGNITION

TECHNICAL FIELD

The present invention relates to a motion recognition remote controller, and more particularly, to a motion recognition remote controller for remotely controlling a control target device to be controlled by analyzing a motion of a hand.

BACKGROUND ART

Recently, various input methods for controlling electronic products have been introduced. Methods such as voice recognition, motion recognition, etc. are being developed as such methods for controlling electronic products. Such methods can be used to remotely control products, and are being spotlighted as smart input methods suitable for the "smart" era since a command is transferred using a portion of a human body.

When a conventional remote controller is replaced by the motion recognition, since the remote controller is not used, it is not necessary to search for a remote controller and manage various types of remote controllers. That is, it is not necessary to search for the remote controller, and a target device can be controlled by a motion of a hand on the spot by replacing a basic operation of the remote controller with a predetermined motion suitable for the target device to be controlled. Accordingly, the technology can create a large market due to its convenience.

Meanwhile, it is necessary to process an image for recognizing a motion of a human in order to recognize the motion. When processing the image, the most important issue is to separate the human's body from the background. A method capable of solving this problem is to use a three-dimensional depth camera. That is, since brightness with respect to a distance is represented on an image when using the three-dimensional depth camera, an object located in the foreground is represented more brightly, and thus the human's body and the background may be separated by extracting relatively brighter portions using this feature, and the human's motion can be found by modeling each joint. However, since the three-dimensional depth camera is very expensive, there is a limitation in replacing low-priced remote controllers.

Accordingly, studies on replacing remote control functions by recognizing hands using a two-dimensional camera have been made, and many patent applications including Korea Patent Application Publication No. 10-2011-0033318 have been filed. However, most of these methods include an operation of recognizing a motion of a hand by extracting a hand region.

However, there are many problems when recognizing the hand from the image. That is, separating the hand and the background is not a simple task, and requires complex image processing having a high error rate. Further, when skin color is used in order to separate the hand, it is not easy to recognize a human having a different skin color, and it is not stably operable according to a change in lighting conditions, etc. When a hand is unable to be recognized through extraction, it is difficult to proceed with a hand recognition operation.

DISCLOSURE

Technical Problem

The present invention is directed to providing a method and an effective motion through which a motion can be recognized without recognizing a hand, and a motion recognition remote controller capable of operating stably and being implemented at a low cost.

Technical Solution

An aspect of the present invention provides a motion recognition remote controller, including: an image acquisition unit configured to acquire continuous images of a hand; a difference image construction unit configured to obtain difference images of the acquired continuous images; a hand trace analysis unit configured to analyze a moving trace of the hand using the difference images; a motion recognition unit configured to recognize a hand motion by analyzing the trace of the hand; and a remote signal transmission unit configured to transmit a remote signal corresponding to the recognized hand motion to control a control target device.

According to the present invention, preferably, the hand trace unit may analyze the moving trace of two hands, the motion recognition unit may recognize the motion of each of the hands, and the remote signal transmission unit may transmit the remote signal for turning the control target device on or off when the hands are synchronized and move in the same cycle.

According to the present invention, preferably, the remote signal transmission unit may transmit the remote signal when the motions of the hands are the same or are symmetric.

According to the present invention, preferably, the hand motion may include a first hand motion and a second hand motion which is continuously performed after the first hand motion is performed, and when the motion recognition unit recognizes the first hand motion, the motion recognition unit may output a recognition completion signal informing a user that the first hand motion is recognized.

According to the present invention, preferably, the recognition completion signal may be output as a light or a sound.

According to the present invention, preferably, the first hand motion may be a motion of moving the hand left and right, and the second hand motion may be a motion of moving the hand up, down, left, or right.

According to the present invention, preferably, the motion recognition unit may calculate a position at which the first hand motion is generated and a position at which the second hand motion is generated, and determine whether the hand moves in any direction of up, down, left, and right in the second hand motion by comparing the position at which the first hand motion is generated and the position at which the second hand motion is generated.

According to the present invention, preferably, the hand motion may be a motion of making a circle.

According to the present invention, preferably, the hand trace analysis unit may calculate the uppermost position of the difference image as a vertical axis direction, calculate the center position of the difference image as a horizontal axis direction, and obtain the trace of the circle.

According to the present invention, preferably, the image acquisition unit may acquire the continuous images of the hand using an infrared ray.

Advantageous Effects

According to the present invention, a motion recognition remote controller can effectively recognize a motion with a low recognition error, and be manufactured at a low cost.

MODES OF THE INVENTION

Hereinafter, a motion recognition remote controller according to embodiments of the present invention will be described below in more detail with reference to the accompanying drawings.

Figure 1:
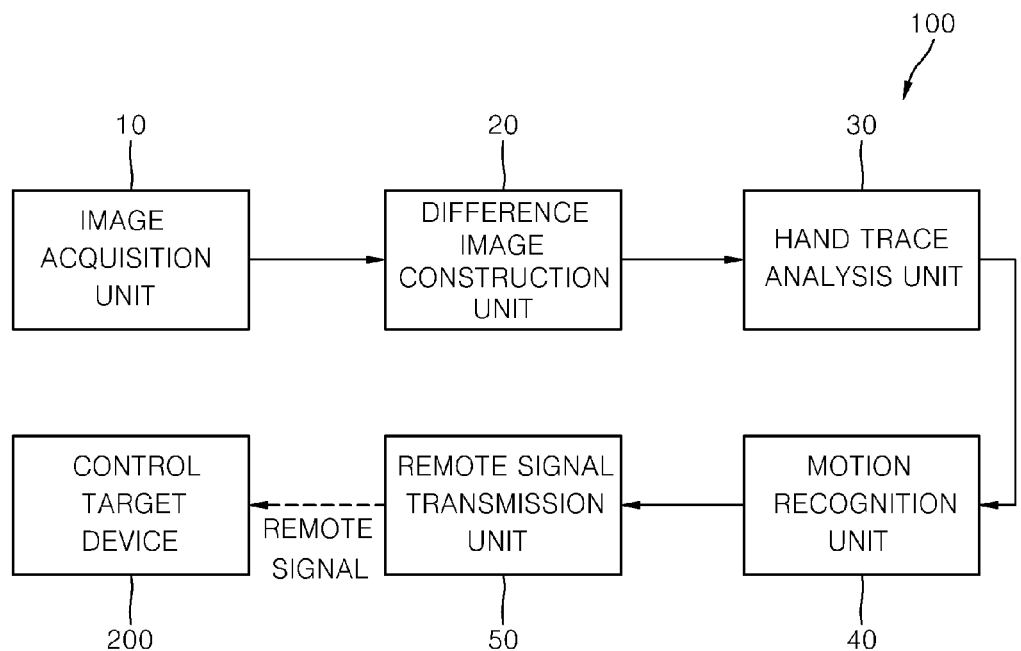
FIG. 1 is a schematic diagram of a motion recognition remote controller according to an exemplary embodiment of the present invention.
Figure 2A:
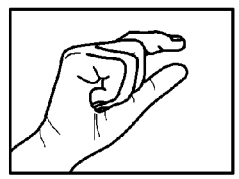
FIG. 2 is a diagram for describing an operation of a difference image construction unit constructing a difference image.
Figure 2B:
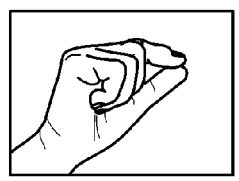
Figure 2C:

FIG. 1 is a schematic diagram of a motion recognition remote controller according to an exemplary embodiment of the present invention. FIG. 2 is a diagram for describing an operation of a difference image construction unit constructing a difference image.

Referring to FIGS. 1 and 2, a motion recognition remote controller 100 according to an exemplary embodiment of the present invention may control a control target device 200 such as a television, lighting, a heating and cooling system, etc. The motion recognition remote controller 100 according to an exemplary embodiment of the present invention may include an image acquisition unit 10, a difference image construction unit 20, a hand trace analysis unit 30, a motion recognition unit 40, and a remote signal transmission unit 50.

The image acquisition unit 10 may acquire continuous images of a moving hand, and may be a digital camera, etc. The image acquisition unit 10 may capture an image including a hand of a user, and transmit the captured image to the difference image construction unit 20. Meanwhile, in order to capture the image of the hand even in a dark state, an infrared camera may be used as the image acquisition unit 10, and the image of the hand may be captured by infrared rays using infrared ray lighting.

The difference image construction unit 20 may acquire a difference image of the continuous images acquired by the image acquisition unit 10. The difference image may be acquired using an image processing method for separating an object from a two-dimensional image, in which only a moving portion, that is, a portion that is different when the two images are compared, is extracted. At this time, since the difference image of a motionless background has a near-zero value, the difference image may disappear when only values equal to or more than a proper threshold value are extracted. For example, when comparing images shown in (a) and (b) of FIG. 2, only a position of an index finger changes, and thus a difference image of the images shown in (a) and (b) of FIG. 2 may be represented as an image shown in (c) of FIG. 2. Meanwhile, although FIG. 2 shows an example in which the position of a finger is changed, when a user moves his or her hand and a position thereof changes, the position change of the hand may be obtained as the difference image, and in an embodiment to be described below, the position change of the hand may be obtained as the difference image and the difference image may be used.

Meanwhile, in the present invention, since the trace of the hand is obtained using the difference image, the hand region need not be extracted. In the conventional art, before recognizing the hand motion, an operation of extracting the hand region using a skin color or outline of the hand was required. However, there was a problem in that recognition errors occurred due to different skin colors or different outlines of hands in the process of extracting the hand region. However, in the present invention, since it is not necessary to extract the hand region, recognition errors for the reasons of the conventional art may be prevented.

The hand trace analysis unit 30 may analyze a moving trace of the hand using the continuous difference images obtained by the difference image construction unit 20.

The motion recognition unit 40 may analyze the moving trace of the hand obtained by the hand trace analysis unit 30, and recognize a kind of motion of a user's hand.

The remote signal transmission unit 50 may transmit a remote signal corresponding to the hand motion recognized by the motion recognition unit 40 to the control target device 200.

Hereinafter, a method of implementing the motion recognition remote controller according to an embodiment of the present invention will be described using a detailed operation as an example.

Figure 3:
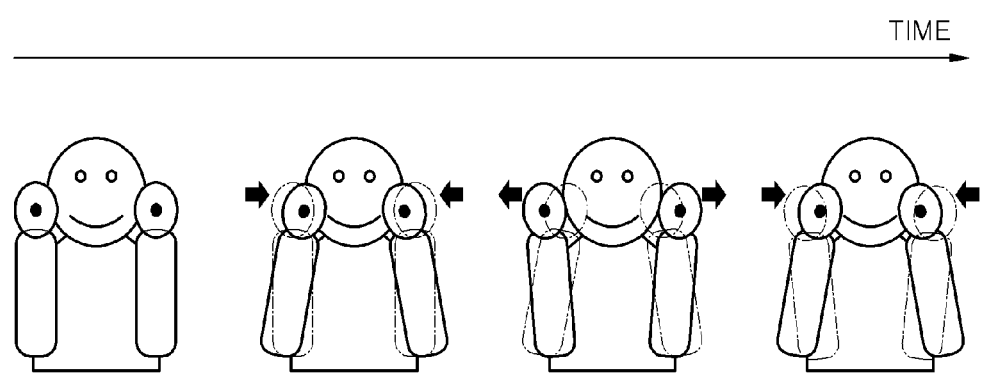
FIGS. 3 to 11 are diagrams illustrating examples of a motion of a hand.

First, a synchronous motion may be defined. The synchronous motion may mean a motion in which both hands are synchronized and also perform a predetermined operation in the same cycle, for example, a motion of symmetrically moving both hands with respect to the body or a motion of moving both hands in the same way, etc. For example, the motion of symmetrically moving both hands may be a motion of moving both hands left and right as shown in FIG. 3, that is, a motion of simultaneously gathering the hands inward and then simultaneously spreading them outward. When the trace of the hands is represented, the trace may be one that is rarely generated in ordinary circumstances.

Meanwhile, in order to recognize the synchronous motion, an operation of recognizing each motion by analyzing the trace of the hands generated in continuous images may be needed. When a motion defined as a basic motion of the synchronous motion is recognized, it may be determined whether there is a motion corresponding to a pair of the synchronous motion recognized within a predetermined time.

For example, when the motion of simultaneously gathering the hands inward and then simultaneously spreading them outward is set as the synchronous motion, it may be determined whether the motion of the right hand corresponds to the pair of the motion of the left hand when the motion of the left hand is matched with the motion of the synchronous motion, and it may be determined whether a motion starting time and a period of the two motions match. Further, since the two motions, that is, the motions of the left hand and the right hand, are generated in one person's body, the two motions may be generated within a predetermined region. For this, whether the two motions are generated within a predetermined horizontal and vertical region may be determined When all the determining operations described above are satisfied, the two motions may be determined to be the synchronous motion.

Meanwhile, the synchronous motion may be used as a motion of turning the control target device on or off. The on/off motion may be a motion of turning the control target device on or off, in which case it is necessary to minimize recognition errors. However, errors are inevitable in motion recognition systems, and thus minimization of such errors is important. Since the synchronous motion which is defined above is rarely generated in ordinary circumstances and is generated only according to a user's intention, it may be possible to minimize recognition errors.

More specifically, supposing that an error rate of erroneously recognizing any motion which is not actually generated as a motion which is generated is E1, and an error rate of erroneously recognizing a motion corresponding to a pair of the motion is E2, a probability of the two errors being generated simultaneously may be decreased to E1*E2. Further, since the two motions are generated within the predetermined region, supposing that a ratio of the predetermined region with respect to an entire region is P, a probability of erroneously recognizing the two motions may be decreased to E1*E2*P. For this reason, a probability of erroneously recognizing the synchronous motion may be greatly reduced. Moreover, in order to reduce recognition errors, when a motion in which the synchronous motion is continuously performed a predetermined number of times or more is defined as the synchronous motion, recognition may be almost completely free of errors.

Figure 4:
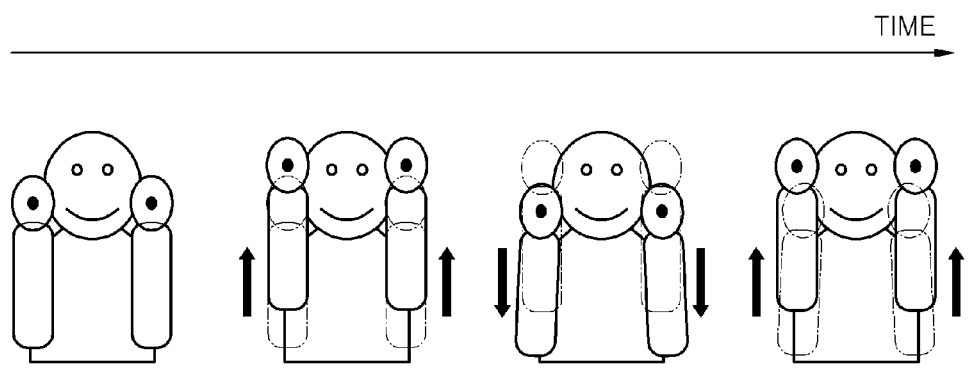
Figure 5:
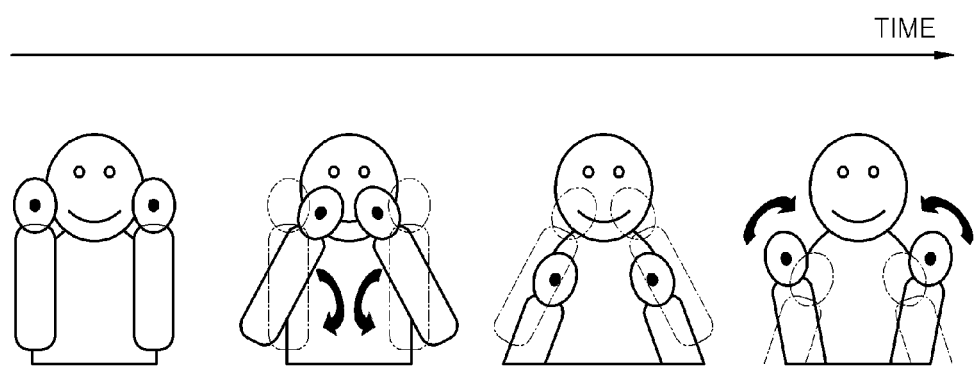

Meanwhile, an operation of simultaneously raising and lowering both hands (that is, a simultaneous motion of both hands) as shown in FIG. 4 may be the synchronous motion. Further, an operation of simultaneously making circles using both hands as shown in FIG. 5 may be the synchronous motion.

Further, when controlling a plurality of control target devices, each control target device may be individually controlled (on/off) by setting the synchronous motion differently for each control target device.

Moreover, in order to prevent confusion with a normal motion that may be frequently generated in ordinary life, the two continuous motions, that is, a complex continuous motion including a first hand motion and a second hand motion, may be defined. Since the complex continuous motion is a motion of sequentially performing two different and continuous hand motions, a recognition error may be reduced by differentiating it from other motions.

At this time, when the first hand motion is recognized in the motion recognition unit 40, the user may be informed that the first hand motion is recognized by a signal. At this time, the user may be informed by an optical signal using a light source such as a light emitting diode (LED), or as a sound such as a beeping sound. When a recognition completion signal of the first hand motion is received, the user may perform a remote control function by performing the second hand motion. Further, since the complex continuous motion is recognized only when the second hand motion is performed within the predetermined time after the first hand motion is recognized, an operation error may be reduced compared with a single motion.

Figure 6:
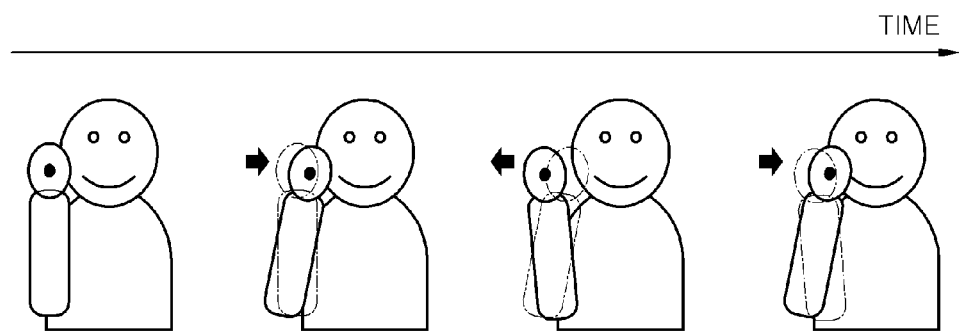
Figure 7:
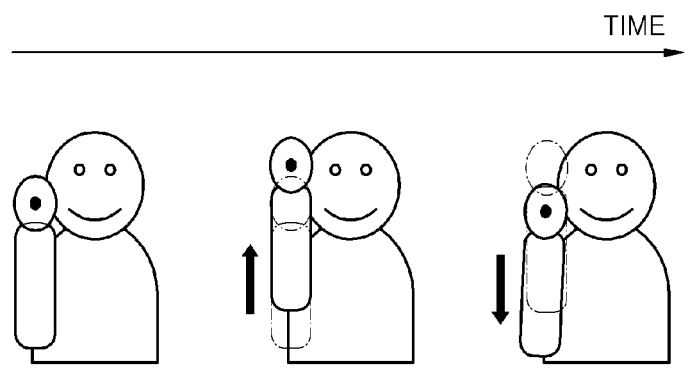
Figure 8:
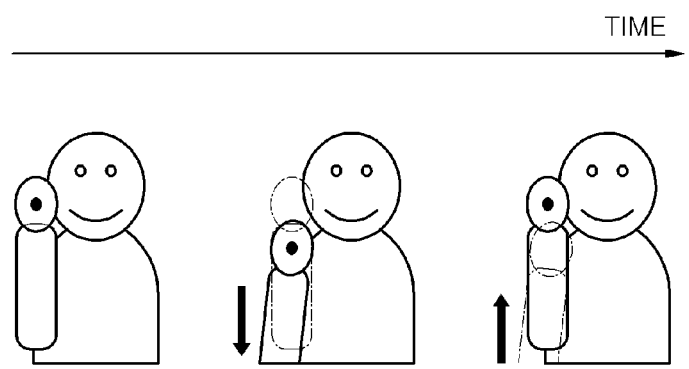
Figure 9:
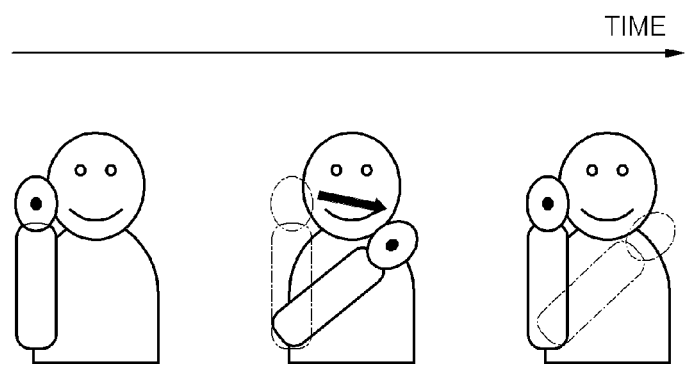
Figure 10:
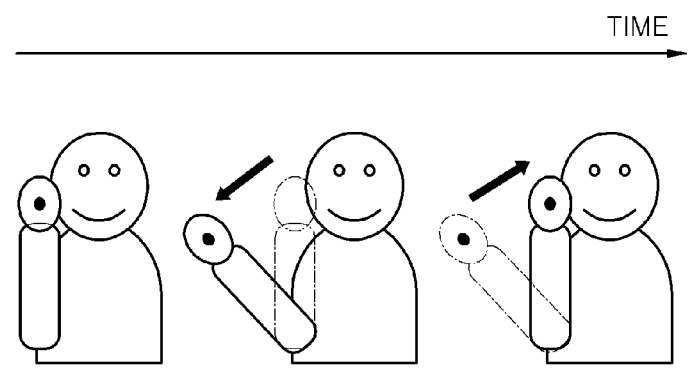

Meanwhile, as an example, the first hand motion may be a motion of moving one hand left and right as shown in FIG. 6. When the motion of moving the hand is recognized, the user may be informed that the motion is recognized using a signal from the LED or the beeping sound. When a recognition completion signal of the first hand motion is received, the user may perform the second hand motion. As examples of the second hand motion, four directional motions of up, down, left, and right as shown in FIGS. 7 to 10 may be recognized as functions of four directional keys of a remote controller.

When the left motion among the four directional motions is performed many times, the left motion may be a motion of moving the hand left from an original position, returning the hand right to the original position, and moving the hand left again. When the left motion is performed many times, since the left motion has the same intermediate motion as the right motion, it may be possible to erroneously recognize the motion. Similarly, the up motion and the down motion may also be recognized erroneously.

In order to solve this problem, the erroneous recognition may be reduced by calculating positions at which the first hand motion and the second hand motion are generated, and comparing the two positions. For example, when the second hand motion is the left motion, since the second hand motion is performed immediately after the first hand motion is completed, the second hand motion may be started at the left of the position of the first hand motion. Similarly, when the second hand motion is the right motion, the up motion, and the down motion, the second hand motion may be started at the right of, above, and below the position of the first hand motion. An erroneous recognition rate of the second hand motion may be remarkably reduced by considering the relative position of the first hand motion and the second hand motion.

Figure 11:
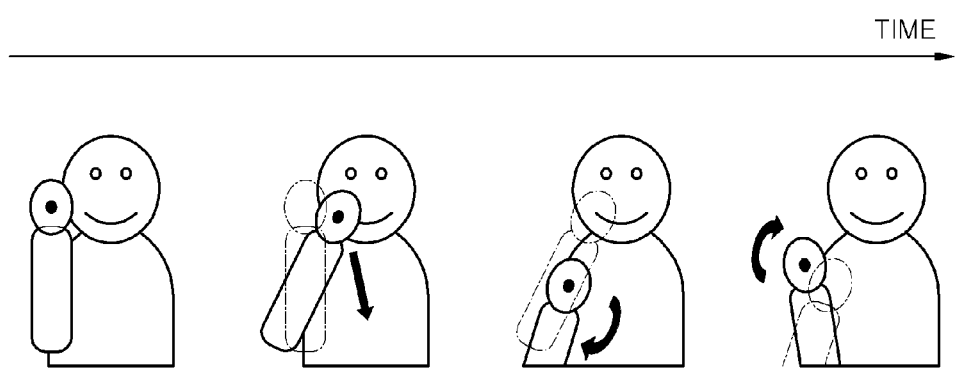

On the other hand, a motion of making a circle as shown in FIG. 11 may be used as another second hand motion. A desired channel number of a television may be detected by counting the number of motions of making the circle clockwise and the number of motions of making the circle counterclockwise and combining the counted numbers.

Meanwhile, aside from the operation described above, there are also single motions that can be differentiated from normal motions. Since the circular motion does not ordinarily occur, the motion may be used as the single motion. In order to recognize the circular motion, when using the difference image, it may be difficult to search for the trace of the hands since arms moving together with the hands as well as the hands are included in a moving portion. In this case, in order to search for the trace of the hands, the uppermost position of the difference image may be used as a vertical axis direction, and the center position of the difference image may be used as a horizontal axis direction. The circle trace of the hands may be precisely obtained by obtaining the trace in this manner.

Accordingly, the single motion may be used as a remote control command which is frequently used since it is easier to make a command than with the synchronous motions described above. For example, in the television (TV), the motion of making the circle clockwise may be used as a command for moving the channel up, and the motion of making the circle counterclockwise may be used as a command for moving the channel down.

Further, as another hand motion, the synchronous motion may be used as the first hand motion of the complex continuous motion. For example, when controlling lighting while lying on a bed, the lighting may be turned on using the synchronous motion of moving the hands left and right, the lighting may be brightened using the motion of making the circle clockwise, and the lighting may be dimmed using the motion of making the circle counterclockwise. Further, brightness of the lighting may be controlled according to directions and the number of motions of making the circle.

Meanwhile, when there is no light, the motion recognition remote controller using a camera may not operate. In order to operate even when there is no light, infrared ray lighting may be used. Further, since the infrared ray lighting is also needed in order to implement a transmission function of the remote controller, two functions may be simultaneously performed. A signal frequency when a lighting function is performed may be different from a signal frequency when the transmission function is performed. Accordingly, when the two functions are used, the two functions can be simultaneously performed by blinking the lighting using the signal frequency corresponding to each function. The number of components can be decreased and costs can be reduced by simultaneously performing the two functions.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A motion recognition remote controller, comprising:
an image acquisition unit configured to acquire continuous images of a hand;
a difference image construction unit configured to obtain difference images of the acquired continuous images;
a hand trace analysis unit configured to analyze a moving trace of the hand using the difference images;
a motion recognition unit configured to recognize a hand motion by analyzing the trace of the hand; and
a remote signal transmission unit configured to transmit a remote signal corresponding to the recognized hand motion to control a control target device,
wherein the hand motion includes a first hand motion and a second hand motion which is continuously performed after the first hand motion is performed, and
when the motion recognition unit recognizes the first hand motion, the motion recognition unit outputs a recognition completion signal informing a user that the first hand motion is recognized and the remote signal transmission unit does not transmit any remote signal corresponding to the first hand motion, and when the motion recognition unit receives the recognition completion signal of the first hand motion, the remote signal transmission unit transmits the remote signal corresponding to only the second hand motion.

2. The motion recognition remote controller according to claim 1, wherein the hand trace unit analyzes the moving trace of two hands, the motion recognition unit recognizes the motion of each of the hands, and the remote signal transmission unit transmits the remote signal for turning the control target device on or off when the hands are synchronized and move in the same cycle.

3. The motion recognition remote controller according to claim 2, wherein the remote signal transmission unit transmits the remote signal when the motions of the hands are the same or are symmetric.

4. The motion recognition remote controller according to claim 1, wherein the recognition completion signal is output as a light or a sound.

5. The motion recognition remote controller according to claim 1, wherein the first hand motion is a motion of moving the hand left and right, and the second hand motion is a motion of moving the hand up, down, left, or right.

6. The motion recognition remote controller according to claim 5, wherein the motion recognition unit calculates a position at which the first hand motion is generated and a position at which the second hand motion is generated, and determines whether the hand moves in any direction of up, down, left, and right in the second hand motion by comparing the position at which the first hand motion is generated and the position at which the second hand motion is generated.

7. The motion recognition remote controller according to claim 1, wherein the hand motion is a motion of making a circle.

8. The motion recognition remote controller according to claim 7, wherein the hand trace analysis unit calculates the uppermost position of the difference image as a vertical axis direction, calculates the center position of the difference image as a horizontal axis direction, and obtains the trace of the circle.

9. The motion recognition remote controller according to claim 1, wherein the image acquisition unit acquires the continuous images of the hand using infrared rays.

* * * * *